US012598066B2

(12) United States Patent
Bornheimer

(10) Patent No.: US 12,598,066 B2
(45) Date of Patent: Apr. 7, 2026

(54) METHODS AND SYSTEM FOR SECURE TRANSMISSION AND STORAGE OF SIGNATURE DATA

(71) Applicant: SOFTWARE AUTOMATION HOLDINGS, LLC, Bridgewater, NJ (US)

(72) Inventor: Zachary Bornheimer, Tampa, FL (US)

(73) Assignee: Software Automation Holdings, LLC, Bridgewater, NJ (US)

( * ) Notice: Subject to any disclaimer, the term of this patent is extended or adjusted under 35 U.S.C. 154(b) by 0 days.

(21) Appl. No.: 19/322,866

(22) Filed: Sep. 9, 2025

(65) Prior Publication Data

US 2026/0074901 A1 Mar. 12, 2026

Related U.S. Application Data

(60) Provisional application No. 63/693,024, filed on Sep. 10, 2024.

(51) Int. Cl.
*H04L 29/06* (2006.01)
*H04L 9/08* (2006.01)
*H04L 9/32* (2006.01)

(52) U.S. Cl.
CPC ............ *H04L 9/088* (2013.01); *H04L 9/0838* (2013.01); *H04L 9/0861* (2013.01); *H04L 9/32* (2013.01); *H04L 9/3247* (2013.01)

(58) Field of Classification Search
None
See application file for complete search history.

(56) References Cited

U.S. PATENT DOCUMENTS

2008/0013733 A1* 1/2008 Johansson ............... H04L 9/007
380/278
2014/0164776 A1* 6/2014 Hook .................. G06F 21/6218
713/171

* cited by examiner

*Primary Examiner* — Andrew J Steinle
(74) *Attorney, Agent, or Firm* — Millen, White, Zelano & Branigan P.C.; William F. Nixon

(57) ABSTRACT

A request is generated including a session identification (ID), an access code, and a sign ID. A lookup key is created using the sign ID and the access code. A contents key is created using the access code, the session ID, and the sign ID. The contents key encrypts content associated with the request. The encrypted content, the look up key, and the contents key are stored at a database. A link is sent to a client device. The link includes the sign ID and the session ID. The access code is received at the facilitation webpage. The sign ID, session ID, and the access code are sent from the facilitation webpage to the database. The content is decrypted based on the contents key, the sign ID, the session ID, and the access code. A captured signature is encrypted using the contents key and stored at the database.

20 Claims, 4 Drawing Sheets

METHODS AND SYSTEM FOR SECURE TRANSMISSION AND STORAGE OF SIGNATURE DATA

FIELD OF THE INVENTION

The present invention relates to a computer platform and associated methods for secure data storage, transmission, and retrieval of sensitive data including private health records, financial records, signature data, and insurance information. More particularly, the present invention allows for real-time implementation of these methods within the computer platform.

DESCRIPTION OF THE RELATED ART

Transmission of data in a secure manner to allow for recall is usually single-modal in nature. All data required to decrypt, transmit, or recall the secure data is provided through the same vector.

SUMMARY OF THE INVENTION

A method for secure transmission and storage of signature data is disclosed. This method can be applied to any server or sensitive data. A graphical representation of a signature, however, is disclosed for illustration. The method includes generating a request including a session identification (ID), an access code, and a sign ID. The method also includes creating a lookup key using the sign ID and the access code. The method also includes creating a contents key using the access code, the session ID, and the sign ID. The contents key is used to encrypt content associated with the request. The method also includes storing the encrypted content, the look up key, and the contents key at a database. The method also includes sending a link to a client device, wherein the link includes the sign ID and the session ID. The method also includes sending the sign ID and the session ID from the client device to a facilitation webpage. The method also includes receiving the access code at the facilitation webpage. The method also includes sending the sign ID, session ID, and the access code from the facilitation webpage to the database. The method also includes decrypting the content at the database based on the contents key, the sign ID, the session ID, and the access code. The method also includes displaying the content at the facilitation webpage. The method also includes capturing a signature corresponding to the content at the client device or the facilitation webpage. The method also includes encrypting the signature using the contents key. The method also includes storing the signature at the database.

In some embodiments, a system is disclosed to implement the above method.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments enable a multi-modal system designed to capture and transmit signatures in real-time. The system defines a way to securely store and retrieve confidential data quickly using centralized, temporary storage. It also allows interaction with the confidential data. The system links two-factor codes as part of the data storage, transmission, and recall (STR) process. The disclosed embodiments also enable methods of secure data storage, transmission, and retrieval of signature data through standard Hypertext Transfer Protocol (HTTP) leveraging the principals behind two-factor authentication as well as secure data practices.

The disclosed embodiments allow for a user-friendly multi-modal security for storage, transmission, and recall of secure data allowing for the benefits of two-factor authentication for identity verification while also requiring two-factor authentication uniformly through the STR process. The STR process as disclosed allows for real-time polling of a central server to retrieve secure data on a local machine preventing a security breach. The disclosed embodiments provide for real-time signature STR that includes an expiry window, such as 10 minutes, thereby allowing for mitigation of security risks. Attacks must be done within the window. After data has been transmitted back to the source of the request or after the expiry window, whichever is first, data is deleted from central transmission servers.

By using two-factor operations are part of the session encryption protocol and using a centralized server, the disclosed embodiments create a system that allows for secure transmission in real-time as each action is reflected in real-time in databases. This feature allows for documents to be transmitted securely as they are encrypted before any caching or storage only able to be decrypted or viewed once the two-factor authentication has been corrected and if the user has provided the original documents. The disclosed embodiments transmit the signature with the same level of security as the documents that are being viewed.

Figure 1:
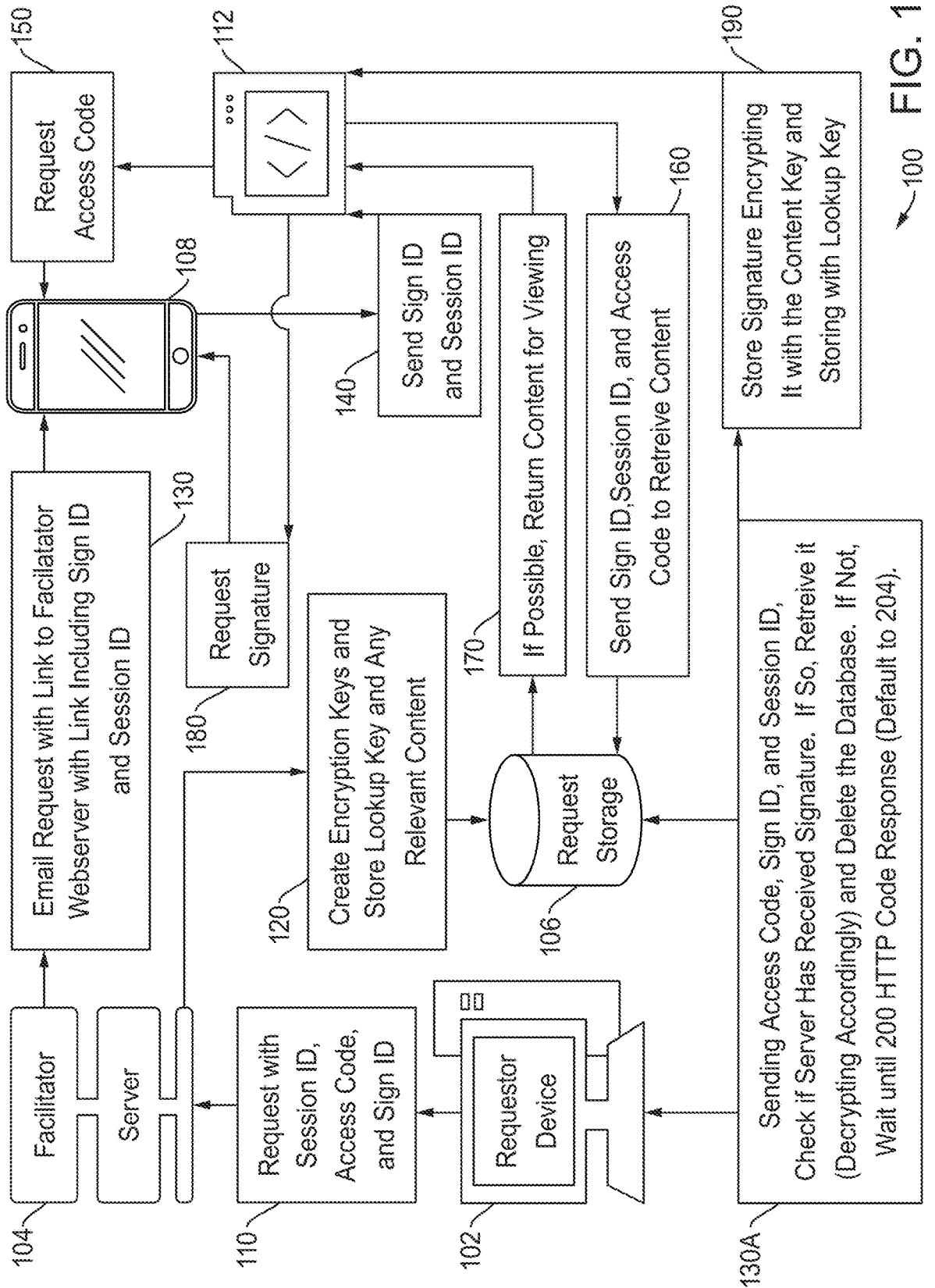
FIG. 1 illustrates a block diagram of a system for secure transmission and storage of secure signature data according to the disclosed embodiments.
Figure 2:
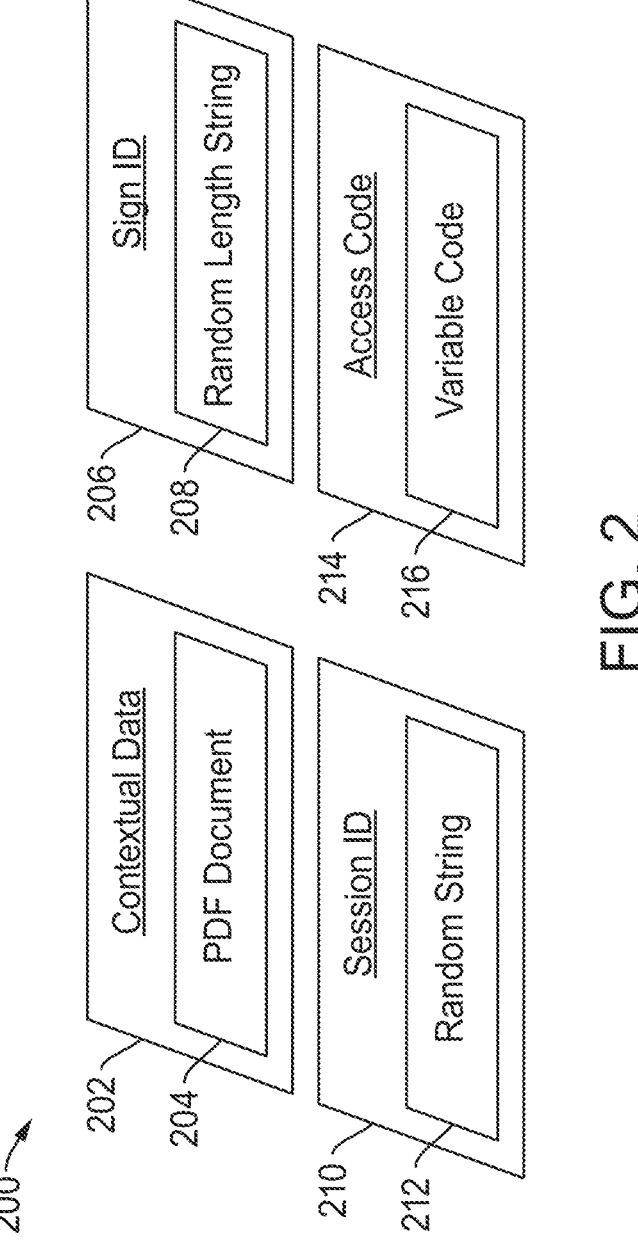
FIG. 2 illustrates a block diagram of pieces of data used in the secure transmission and storage according to disclosed embodiments.

FIG. 1 depicts a block diagram of a system 100 for secure transmission and storage of secure signature data according to the disclosed embodiments. System 100 includes a requestor device 102, a facilitator 104, a request storage database server 106 (this may be a server with access to a storage database), client device 108, and facilitation webpage 112. Various types of data may be exchanged within system 100. The types of data may be shown in FIG. 2, which depicts a block diagram of pieces of data used in the secure transmission and storage.

One piece of data may be contextual data 202. Contextual data 202 may include a PDF document 204. A request may be made for a user to review and sign PDF document 204. Another piece of data may be sign identification (ID) 206. Sign ID 206 includes a long random-length string 208 that is associated with a particular data field. Random-length string 208 may reflect the domain or host originating the request, local time, or other user-specific data.

Another piece of data may be session ID 210. Session ID 210 may include a medium-length random string 212 that is based on the current browser section, such as one hosted by facilitation webpage 112. Another piece of data may be access code 214. Access code 214 includes a variable code 216 generated client-side. The length of variable code 216 may vary but the disclosed embodiments may implement a four-digit sequence.

Thus, in one browser session, there may be two transmissions according to the disclosed embodiments. For example, there may be two signatures to collect. In this instance, each sign ID 206 will be different, but the session ID 210 will be the same for both transmissions. Access code 214 should be different for every field, every time.

Referring to FIG. 1, operation 110 may include a request with session ID 210, access code 214, and sign ID 206. The request may be sent from requestor device 102 to facilitator server 104. Operation 120 may create encryption keys and store lookup key and any relevant content that is encrypted with a content key. Facilitator server 104 may create the encryption keys and store at request storage database server 106.

Operation 130 may execute by emailing the request with a link including sign ID 206 and session ID 210 as hosted on facilitator server 104. Server 104 sends the request to client device 108. Requestor device 102 then sends access code 214, sign ID 206, and session ID 210 to request storage database server 106 in operation 130A. This operation may be recurring and checks if database server 106 received the signature from client device 108. If so, then the disclosed embodiments retrieve the signature by decrypting accordingly. The database record for the signature is deleted from database server 106. If the signature is not received, then the disclosed embodiments wait until 200 HTTP code response, or default to 204 is not found. The disclosed embodiments may implement standard HTTP request response codes. A response code of 200 means that the content was found and is normal. A response code of 404, for example, means a document is not found. A response code of 500 means server error.

Operation 140 sends sign ID 206 and session ID 210 from client device 108 to facilitation webpage 112. The disclosed embodiments also may execute operation 130A, as disclosed above to determine if the signature has been received at database server 106. Operation 150 executes by requesting access code 214 from client device 108. The disclosed embodiments also may execute operation 130A, as disclosed above.

Operation 160 sends sign ID 206, session ID 210, and access code 214 to retrieve content, or contextual data 202. For example, the data is sent from facilitation webpage 112 to database server 106 to retrieve PDF document 204. Facilitation webpage 112 sends the data after receiving access code 214 from client device 108. If the content is not available, then the disclosed embodiments return to operation 150. If the content is available, then the disclosed embodiments proceed to operation 170. The disclosed embodiments also may execute operation 130A, as disclosed above.

Operation 170 returns decrypted content, or contextual data 202, for viewing to facilitation webpage 112 from database server 106. After receipt of sign ID 206, session ID 210, and access code 214 from facilitation webpage 112, database server 106 may decrypt the content and forward to the facilitation webpage 112. A user may view the content on facilitation webpage 112. The disclosed embodiments also may execute operation 130A, as disclosed above.

Operation 180 requests signature for the content provided from database server 106. Facilitation webpage 112 requests the signature from client device 108. The user, viewing the content on facilitation webpage 112 receives the request on client device 108 and acts accordingly. Preferably, the user signs on facilitation webpage 112. The disclosed embodiments also may execute operation 130A, as disclosed above.

Operation 190 stores and, possibly, encrypts the signature. Facilitation webpage 112 sends the signature to database server 106. The signature is encrypted with a content key, disclosed in greater detail below. The signature is stored at database server 106 with a lookup key, also disclosed in greater detail below. The disclosed embodiments also may execute operation 130A, as disclosed above. Requestor device 102 should now resolve operation 130A with, for example, a 200 HTTP code response. Instead of deleting the database, the disclosed embodiments delete the related database entries including the lookup key from the database and purge related files. The signature then is retrieved on requestor device 102.

Because sign ID 206 and session ID 210 are provided in one medium and access code 214 in another, the disclosed embodiments add another level of validation corresponding to two-factor authentication. Sign ID 206 and session ID 210 may not be provided directly through requestor device 102 but, instead, these pieces of data are transmitted to the signer to client device 108. For example, an API request for the signature should email a link with sign ID 206 and session ID 210 but access code 214 is provided by client device 108.

Access code 214 serves as a segmented encryption factor. Part of the way that the data or content is encrypted or decrypted is by using access code 214, which is not directly part of the normal decryption key. Instead, it is a piece of the decryption key that is kept separate. By using access code 214 as a segmented encryption factor, the disclosed embodiments are able to add an additional level of authentication. It may be desired that access code 214 is provided through a separate medium then sign ID 206 and session ID 210. This feature helps ensure that the person accessing contextual data 202, or PDF document 204, is authorized to do so. Even if sign ID 206 and session ID 210 are provided, the disclosed embodiments force a secondary authorization parameter to be provided and correct in order to decrypt.

Sign ID 206 is a code representing the signature being requested. In some embodiments, sign ID 206 is an identifier for a particular request that helps identify a device, hostname, and the core of the actual request. Without sign ID 206, it would be less secure to have multiple signatures requests in one session. If only access code 214 is required, then it would be easier to guess or harder to provide that access code.

Session ID 210 represents a particular user's browser session that prevents two webpages opened on the same local network in the same place to generate encryption keys. This feature helps reduce encryption collisions.

Figure 3:
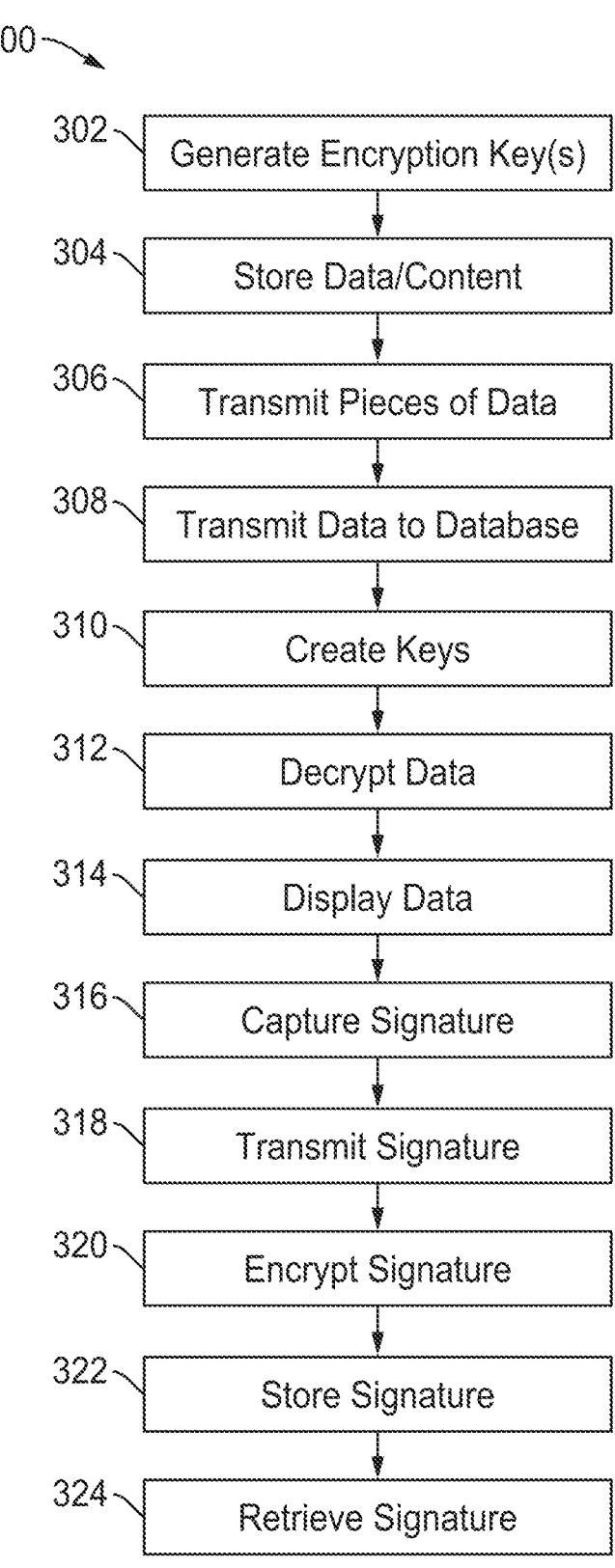
FIG. 3 illustrates a flowchart for performing operations for secure transmission and storage of secure signature data in the system according to the disclosed embodiments.

FIG. 3 depicts a flowchart 300 for performing operations for secure transmission and storage of secure signature data in system 100 according to the disclosed embodiments. Flowchart 300 may refer to FIGS. 1-2 for illustrative purposes. Flowchart 300, however, is not limited to the embodiments disclosed by FIGS. 1-2.

Figure 4A:
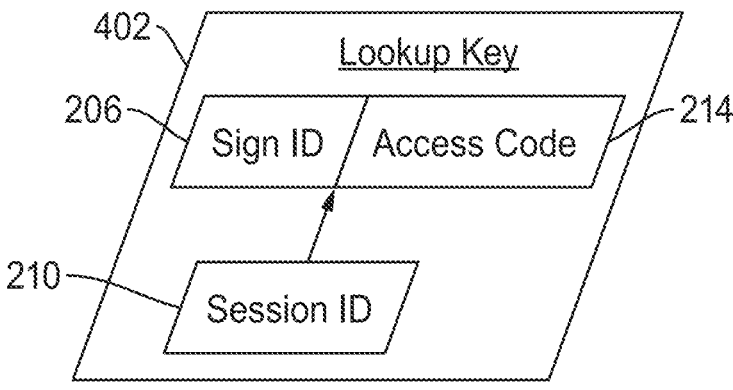
FIG. 4A illustrates a block diagram of a lookup key according to the disclosed embodiments.
Figure 4B:
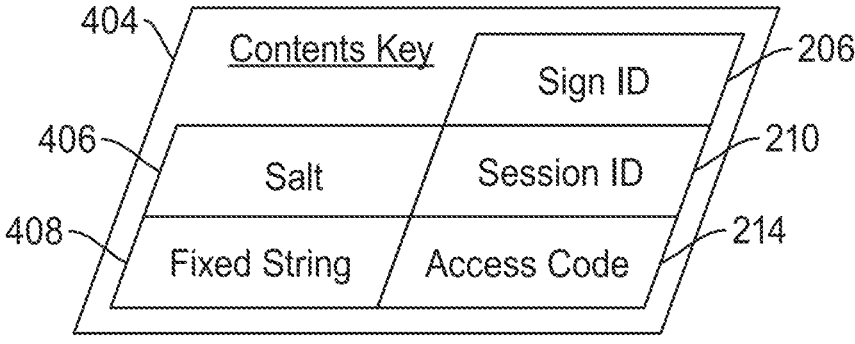
FIG. 4B illustrates a block diagram of a contents key according to the disclosed embodiments.

Step 302 executes by generating encryption keys. A lookup key 402 may be used for database storage. Lookup key 402 is disclosed in greater detail by FIG. 4A. A contents key 404 may be used for file content security. Contents key 404 is disclosed in greater detail by FIG. 4B.

Lookup key 402 may be used as a rapid-lookup database index to quickly identify signatures in process. Some combination of sign ID 206 and access code 214 allows for the rapid lookup. In some embodiments, an algorithm is used to encrypt these two strings. Sign ID 206 and access code 214 may be combined in some manner using session ID 210 as the salt under standard encryption practice. Salting is a security process that involves adding a random string of characters, known as the salt, to a password before it is hashed. The salt may be unique to each user, as evidenced by session ID 210, and only known to facilitator server 104. In some embodiments, the AES-256 algorithm may be used to encrypt sign ID 206 and access code 214 along with session ID 210 as the salt.

Contents key 404 may be a more secure key and should be a combination of three data points. These data points are access code 214, session ID 210, and sign ID 206 in some fixed variation or permutation encrypted with a variation of the session ID as salt 406. Other possible combinations may include the first five characters of sign ID 206 followed by session ID 210, the rest of sign ID 206, and then access code 214. Another combination may be sign ID 206, access code 214, and then session ID 210. This combination also may include a combination having sign ID 206, access code 214, and session ID 210 along with a fixed string 408 that is specific to the implementation, such as my_identifier. In some embodiments, the AES-256 algorithm may be used to encrypt the data.

Because all these pieces are variable length, it may be difficult to split these pieces back into their original fragments once they are joined or combined. Thus, it is important that none of these individual pieces of data are stored with contents key 404 in the databases. Only lookup key 402 should be stored with any relevant data.

Step 304 executes by storing the data or content, such as contextual data 202, to be transmitted using lookup key 402 as the database index for prompt identification. Using contents key 404, the disclosed embodiments encrypt the contents of each file or data point that is being transmitted. These encrypted contents may be stored using lookup key 402.

Step 306 executes by transmitting pieces of data needed to perform the signature operations. Using some sort of primary modality, such as email, a link is provided to the user, or signer, to the preview URL. The preview URL should provide sign ID 206 and session ID 210 to use but not access code 214. Access code 214 should be provided in a different modality, such as a text message on client device 108. Thus, access code 214 should be much simpler to communicate than a longer code like sign ID 206. The preview URL will ask the user for access code 214. The preview site request that database server 106 to generate lookup key 402, contents key 404, and retrieve and decrypt contextual data 202 as well as return PDF document 204, if possible. If database server 106 fails to return a PDF, then the user will be re-prompted to enter access code 214 and will be shown a relevant error message. The preview site should have a delay from 0.10 seconds to 1 second to prevent spam attacks.

Step 308 executes by transmitting data generated in step 306 to database server 106. After access code 214 is collected, access code 214, sign ID 206, and session ID 210 should be transmitted to storage database server 106, acting as a data retrieval system. Step 310 executes by creating lookup key 402 and contents key 404 using all three pieces of data at the retrieval system, or database server 106. Step 312 executes by decrypting the content data using both keys 402 and 404. Lookup key 402 may be used to look up the content data and contents key 404 may be used to decrypt it. Step 314 executes by displaying the content to the user using facilitation website 112.

Step 316 executes by capturing the signature of the user, or signatures of multiple users. The signature may be captured by client device 108 or facilitation webpage 112. Step 318 executes by transmitting the signature back to database server 106, acting as the central server. Step 320 executes by encrypting the signature data using the same protocol as done for content or file data. Step 322 executes by storing the encrypted signature data in database server 106.

Step 324 executes by retrieving the signature data within system 100. A device that has access code 214, sign ID 206, and session ID 208 may send an automated request to a retrieval endpoint to retrieve the signature data provided the device supplies the data to database server 106 to generate lookup key 402 and contents key 404. For example, if the signature is not provided, then database server 106 may respond with a 204 no content message. Once a signature is detected, database server 106 may respond with the decrypted signature data and delete the signature data from database server 106.

Many systems allow setting a time to live (TTL) for database entries and files. The feature of setting the stored database entries to the expiry window will allow for automated cleanup.

The disclosed embodiments may help in not giving away access code 214 or lookup key 402. The disclosed embodiments use access code 214 to augment sign ID 206 as encrypted with session ID 210. The actual combinatorics involved in the union between sign ID 206 and access code 214 are variable and would help immediately obfuscate the code. It may be desired to use access code 214 with lookup key 402 in case there are multiple requests being made, such as if there are two signature requests that, by chance, end up with the same sign ID 206. By encrypting the sign ID and access code combination, the potential for giving away access code 214 is less likely. If lookup key 402 is decrypted, then the final layer of defense is the obfuscation layer.

Thus, the disclosed embodiments use two-factor codes generated per access as well as a session-based token and a variable, but algorithmically consistent, token to transmit data. The two-factor code may include a one time use token only for this request. A consistent token is used to represent the request source and used every time this particular request is made. A session code is used as a session token for all requests in the session.

The disclosed embodiments also request contracts or documents to be shown to a user. The disclosed embodiments also encrypt the materials and send the user a link to the facilitating webpage. The disclosed embodiments have that user be authenticated using the access code. The contracts or documents are shown to the user along with a link containing the sign ID and the session ID. The disclosed embodiments allow the user to generate an image, which is treated as a signature. That image is stored in a database. The signature is returned upon automatic retrieval request. All of these operations are performed with the same level of encryption.

In some embodiments, the access code may be the same on a local area network, by chance, as another signature or device. It is possible for the sign ID to be the same on multiple devices or sessions depending how it is structured. The use of the recommended practice of including the local time in microseconds helps reduce the likelihood of this situation. The session ID, however, is unique to individual browsing sessions. The likelihood of all three pieces of random data being the same is very slim, or practically zero. If it is greater than zero, then the expiry limit helps reduce that probability even further.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed embodiments may be made without departing from the spirit or scope of the invention. Thus, it is intended that the present invention covers the modifications and variations disclosed above provided that these changes come within the scope of the claims and their equivalents.

The invention claimed is:

1. A method for secure transmission and storage of signature data, the method comprising:
    generating a request including a session identification (ID), an access code, and a sign ID;
    creating a lookup key using the sign ID and the access code;
    creating a contents key using the access code, the session ID, and the sign ID, wherein the contents key is used to encrypt content associated with the request;
    storing the encrypted content, the look up key, and the contents key at a database;
    sending a link to a client device, wherein the link includes the sign ID and the session ID;
    sending the sign ID and the session ID from the client device to a facilitation webpage;
    receiving the access code at the facilitation webpage;
    sending the sign ID, the session ID, and the access code from the facilitation webpage to the database;
    decrypting the content at the database based on the contents key, the sign ID, the session ID, and the access code;
    displaying the content at the facilitation webpage;
    capturing a signature corresponding to the content at the client device or the facilitation webpage;
    encrypting the signature using the contents key; and
    storing the signature at the database.

2. The method of claim 1, further comprising retrieving the signature from the database upon receipt of the sign ID, the session ID, and the access code.

3. The method of claim 1, further comprising deleting the lookup key from the database.

4. The method of claim 1, wherein the access code is a segmented encryption factor.

5. The method of claim 1, wherein the sign ID is a code related to the signature.

6. The method of claim 1, wherein the session ID relates to a browser session.

7. The method of claim 1, further comprising generating the lookup key using an encryption algorithm.

8. The method of claim 7, wherein the encryption algorithm uses a salt.

9. The method of claim 8, wherein the salt includes a random string of characters.

10. A method for secure document management, the method comprising:
    generating an encryption key;
    generating a lookup key from a subset of the encryption key;
    generating an access key from an omitted part of the encryption key;
    encrypting a PDF document with the encryption key;
    storing the lookup key in a database;
    presenting the access key with the lookup key;
    finding the encrypted PDF document by the lookup key;
    recreating the encryption key through the provided access key and the lookup key; and
    attempting to decrypt and return the PDF document with the recreated encryption key.

11. The method of claim 10, further comprising providing an error message or alert if the encrypted PDF document cannot be located or decrypted.

12. The method of claim 10, further comprising deleting a related database entry in the database after the encrypted PDF document is retrieved.

13. The method of claim 12, further comprising deleting the encrypted PDF document from the database.

14. The method of claim 10, wherein the document management includes document storage, access, or retrieval.

15. A method for secure transmission and storage of signature data, the method comprising:
    creating a lookup key using a sign identification (ID) and an access code;
    generating a contents key using the access code, a session ID, and the sign ID, wherein the contents key is used to encrypt content;
    storing the encrypted content, the look up key, and the contents key;
    sending a link to a client device, wherein the link includes the sign ID and the session ID;
    sending the sign ID and the session ID from the client device to a facilitation webpage;
    receiving the access code at the facilitation webpage;
    sending the sign ID, the session ID, and the access code to a database;
    decrypting the content at the database based on the contents key, the sign ID, the session ID, and the access code;
    capturing a signature corresponding to the content at the client device or the facilitation webpage;
    encrypting the signature using the contents key; and
    storing the signature at the database.

16. The method of claim 15, further comprising displaying the content at the facilitation webpage.

17. The method of claim 15, wherein the content is associated with a request.

18. The method of claim 17, further comprising generating the request including the session ID, the access code, and the sign ID.

19. The method of claim 15, further comprising retrieving the signature from the database upon receipt of the sign ID, the session ID, and the access code.

20. The method of claim 15, further comprising deleting the lookup key from the database.

* * * * *